United States Patent
Wood et al.

(10) Patent No.: US 7,456,841 B2
(45) Date of Patent: Nov. 25, 2008

(54) GRAPHIC IMAGE TEXTURE GENERATION

(75) Inventors: Karl J. Wood, Crawley (GB); Cornelis W. A. M. Van Overveld, Eindhoven (NL); Hendrik Dijkstra, Eindhoven (NL); Douglas R. M. Patterson, Cambridge (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1653 days.

(21) Appl. No.: 09/118,572

(22) Filed: Jul. 17, 1998

(65) Prior Publication Data

US 2002/0057277 A1 May 16, 2002

(30) Foreign Application Priority Data

Jul. 17, 1997 (GB) ................. 9715005.6

(51) Int. Cl.
*G09G 5/00* (2006.01)
*G09G 5/36* (2006.01)
*G06F 13/14* (2006.01)

(52) U.S. Cl. .................. 345/582; 345/519; 345/557

(58) Field of Classification Search ............... 345/430, 345/582, 519, 557
See application file for complete search history.

(56) References Cited

U.S. PATENT DOCUMENTS

| | | | | | |
|---|---|---|---|---|---|
| 5,097,427 A | * | 3/1992 | Lathrop et al. | ............... | 345/430 |
| 5,274,760 A | * | 12/1993 | Schneider | ............... | 345/193 |
| 5,388,206 A | * | 2/1995 | Poulton et al. | ............... | 345/505 |
| 5,481,669 A | * | 1/1996 | Poulton et al. | ............... | 345/505 |
| 5,548,709 A | * | 8/1996 | Hannah et al. | ............... | 345/510 |
| 5,680,525 A | * | 10/1997 | Sakai et al. | ............... | 345/430 |
| 5,748,202 A | * | 5/1998 | Nakatsuka et al. | ............... | 345/441 |
| 5,812,141 A | * | 9/1998 | Kamen et al. | ............... | 345/430 |
| 5,847,712 A | * | 12/1998 | Salesin et al. | ............... | 345/582 |
| 5,880,737 A | * | 3/1999 | Griffin et al. | ............... | 345/430 |
| 5,925,123 A | * | 7/1999 | Tremblay et al. | ............... | 712/212 |
| 5,926,647 A | * | 7/1999 | Adams et al. | ............... | 395/800.36 |
| 5,999,189 A | * | 12/1999 | Kajiya et al. | ............... | 345/430 |
| 6,005,582 A | * | 12/1999 | Gabriel et al. | ............... | 345/430 |
| 6,052,126 A | * | 4/2000 | Sakuraba et al. | ............... | 345/430 |
| 6,111,582 A | * | 8/2000 | Jenkins | ............... | 345/421 |

FOREIGN PATENT DOCUMENTS

EP 0613098 A2 8/1994

(Continued)

OTHER PUBLICATIONS

"Real-time procedural textures", Rhoades et al., Jun. 1992, Proceedings of the 1992 symposium on Interactive 3D graphics, pp. 95-100.*

(Continued)

*Primary Examiner*—Ryan R Yang

(57) ABSTRACT

An apparatus for texture mapping in a computer graphics system, using a predetermined set of standardized textures. Each texture of the standardized set is a procedural texture, and is supplied to the apparatus as one or a sequence of program commands the execution of which will result in the generation of the respective procedural texture. In a preferred embodiment, the means for processing the program commands comprises a processor operable to implement only those input program commands or sequences of input program commands as are required to generate the procedural textures of the standardized set.

11 Claims, 4 Drawing Sheets

FOREIGN PATENT DOCUMENTS

| | | |
|---|---|---|
| EP | 0747858 | 12/1996 |
| WO | 9524682 | 9/1995 |

OTHER PUBLICATIONS

"Real-time programmable shading", Lastra et al., Apr. 1995, Proceedings of the 1995 symposium on Interactive 3D graphics, pp. 59-66, 207.*

"Computer Graphics Principles and Practice" by Foley, Van Dam, Feiner and Hughes, published by Addison-Wesley, ISBN 0-201-12110-7, pp. 741-744.

"Delivering Compelling 3D Content on the Web" An Internet white paper from S3 Incorporated, Jan. 1997.

* cited by examiner

GRAPHIC IMAGE TEXTURE GENERATION

BACKGROUND OF THE INVENTION

The present invention relates to image processing and in particular to means for texture mapping in the rendering of two dimensional pixel images, where those images are made up of a number of polygons defined in three-dimensional (object) space and projected into two-dimensional (screen) space, and pixel texture values (texels) from a two dimensional texture map are mapped onto pixel positions within the projected two dimensional polygons.

The process of texture mapping is well known, in essence comprising the step of wrapping a two-dimensional picture or texture over a geometric surface in order to give a greater degree of realism and often a reduction in the geometric complexity of the object. Basic texture mapping techniques are described for example in "Computer Graphics: Principles and Practice" by Foley, van Dam, Feiner and Hughes, published by Addison Wesley 1990, ISBN 0-201-12110-7, at pages 741-744.

An increasingly common use for texture mapping of polygons is in the generation of so-called virtual environments which a user is then enabled to navigate or even interact with, for example in a flight simulator or virtual reality and games applications. While generally hosted on a single system, these generated virtual environments are not limited to a single user and, with the increase in communications via local or large area data networks, a single virtual environment may be visited simultaneously by users from different countries or continents. As with all such data networks, however, there is a limit to the available bandwidth which raises the need to find a balance between the frequency at which updated images of the virtual environment may be transmitted across the network and the level of detail that may be represented.

The problem may be reduced when the format of data storage and representation for such virtual environments is at least partially standardized, allowing for greater interchange between systems of different manufacturers and simplification of standard commands, as well as a reduction in the necessity for individually tailored translation utilities. With at least partial standardization, the necessary configuration of a browser for accessing such data, whether in a hardware or software implementation or a mixture of the two, becomes simpler.

A notable example of standardization in the field of data defining virtual environments is the so-called Virtual Reality Modelling Language (VRML) as described, for example, in the VRML standard, version 2.0, issued as ISO/IEC WD14772 on Aug. 4, 1996. VRML is a file format for describing interactive three-dimensional objects and worlds to be experienced on the Internet/World Wide Web and it is generally analogous to the way HTML (HyperText Markup Language) is used to describe documents for transmission over the Internet. In order to simplify the specification of how objects appear within a virtual environment, it is a known technique in formats such as VRML to restrict such objects to constructions from a limited set of "building blocks" such as rods, cones and cubes, which may be simply specified in relatively few parameters.

In an Internet White Paper issued by S3 Incorporated in January 1997, entitled "Delivering Compelling 3D Content on the Web" it was proposed to extend this standardization to textures and, in order to reduce the volume of data transmitted per scene, to provide users with a local library of the standard textures in the form of a collection of texture maps to be held on the users hard drive. Operationally, it was suggested that the users system would first check the local hard drive for a specified texture before calling for it to be transmitted from the virtual environment host.

While maintaining a local store of textures does greatly reduce the volume of data sent via data network, it also generates its own problems. Apart from the expected difficulties of persuading different system manufacturers to agree on a standardized texture set, the principle problem is the amount of space on a users hard disk that will be taken up if the set contains many different textures. This problem is compounded by the need to hold each texture at at least two different resolutions to enable interpolation and extrapolation techniques to be used to create textures at desired resolution levels. Furthermore, while the volume of data network traffic is reduced, there is an increase within the users system, between a graphics engine and the hard disk.

SUMMARY OF THE INVENTION

It is therefore an object of the present invention to reduce the volume of data required to be stored by a users system without generating a corresponding increase in external data traffic.

In accordance with a first aspect of the present invention there is provided an apparatus for texture mapping in a computer graphics system, using a predetermined set of standardized textures, the apparatus having an input to receive data identifying one of the set of standardized textures, and means for processing the data to generate output texels of the identified texture; characterised in that each texture of the standardized set is a procedural texture, the input identifying data comprises one or a sequence of program commands the execution of which will result in the generation of a respective procedural texture, with the means for processing data comprising a processor operable to implement all such input program commands or sequences of input program commands as required to generate the procedural textures of the standardized set.

By using a standardized set of procedural textures (texture patterns which may be generated from a specifying descriptor or algorithm, such as chess boards, woodgrain or marbling), the need to give over areas of local storage to texture maps is avoided as the texture can be generated as required. Suitably, the apparatus has at least one further input for one or more predetermined classes of numerical parameter, with the processor being arranged to generate procedural textures with reference to the or each numerical parameter value received. Such a predetermined class of numerical parameter may suitably comprise a scale factor, or the scale factor may be input in a different form, with the processor then being arranged to generate a procedural texture at a resolution determined by a received scale factor. In terms of a two-dimensional image composed from polygons projected from three-dimensional object space, this scale factor will directly relate the depth and orientation of the polygon surface to be textured with the texture resolution to be applied. With such parameterization of the predetermined procedural texture set, the requirement to specify texture at different levels of resolution is avoided, further reducing the volume of data involved.

In a preferred embodiment, the processor is operable to implement only such input program commands or sequences of input program commands as required to generate those procedural textures of the standardized set. This places a finite limit on the required capability of the processor leading to faster operation and allowing the apparatus to be implemented as a single semiconductor chip.

In a modified embodiment, the apparatus may further comprise a cache memory coupled with the processor, with the processor being configured to generate said procedural textures as texture maps within said cache. Such an embodiment suitably further comprises an input to receive a scale factor, and an interpolator to generate output texels from texture map entries in the cache at a resolution determined by the received scale factor. As with the first embodiment, this modified embodiment may suitably be provided on a semiconductor chip, with the processor, cache and interpolator on a common substrate. Although not as flexible or fast as the direct texel generation of the first embodiment, this modified embodiment with cache is substantially faster than the prior art technique of storing the predetermined textures as a series of texture maps on a users hard disk and then reading the required texel values.

Also in accordance with the present invention there is provided a computer graphics system including either the first or modified embodiments of texture mapping apparatus described above, together with a source of three-dimensional polygon data, a geometry processor coupled to receive said polygon data and arranged to generate a two-dimensional representation of said polygons, a source of program commands coupled to the input of the texture mapping apparatus and specifying textures to be applied to respective ones of said polygons, and rendering means coupled to receive the outputs of the geometry processor and texture mapping apparatus and arranged to generate an output image of said polygons with texture applied.

In such a computer graphics system, the sources of polygon data and program commands may comprise an interface to a data network (such as the Internet) to which are coupled remote sources of such polygon data and program commands, the interface being coupled with a memory holding a store of network addresses for such remote sources and being operable to format and transmit messages to such addresses calling for the polygon data and program commands. In such an arrangement, the use of a standardized set of procedural textures provides a notable speed improvement due to the reduced volume of data transmitted in comparison with a full texture map: due to the standardization of the set, only a short identifier may be required in the request for texture, and its transmitted form as a sequence of program commands will be of smaller volume than sending a full texture map in encoded form. In this networked embodiment, for reasons of flexibility, the program commands are liable to be transmitted over the network in a virtual machine code and the system would accordingly further comprise means for conversion of the same to a local machine code supported by the processor.

BRIEF DESCRIPTION OF THE DRAWINGS

Preferred embodiments of the present invention will now be described, by way of example only, with reference to the accompanying drawings, in which.

DESCRIPTON OF THE PREFERRED EMBODIMENTS

In the following examples, a system supporting the above-mentioned VRML standard for describing virtual environments and embodying the present invention for texture mapping in the generation of two-dimensional images of such environments will be described. It will be recognized, however, that conformance with the VRML standard is neither an essential nor a limiting feature of the present invention.

Figure 1:
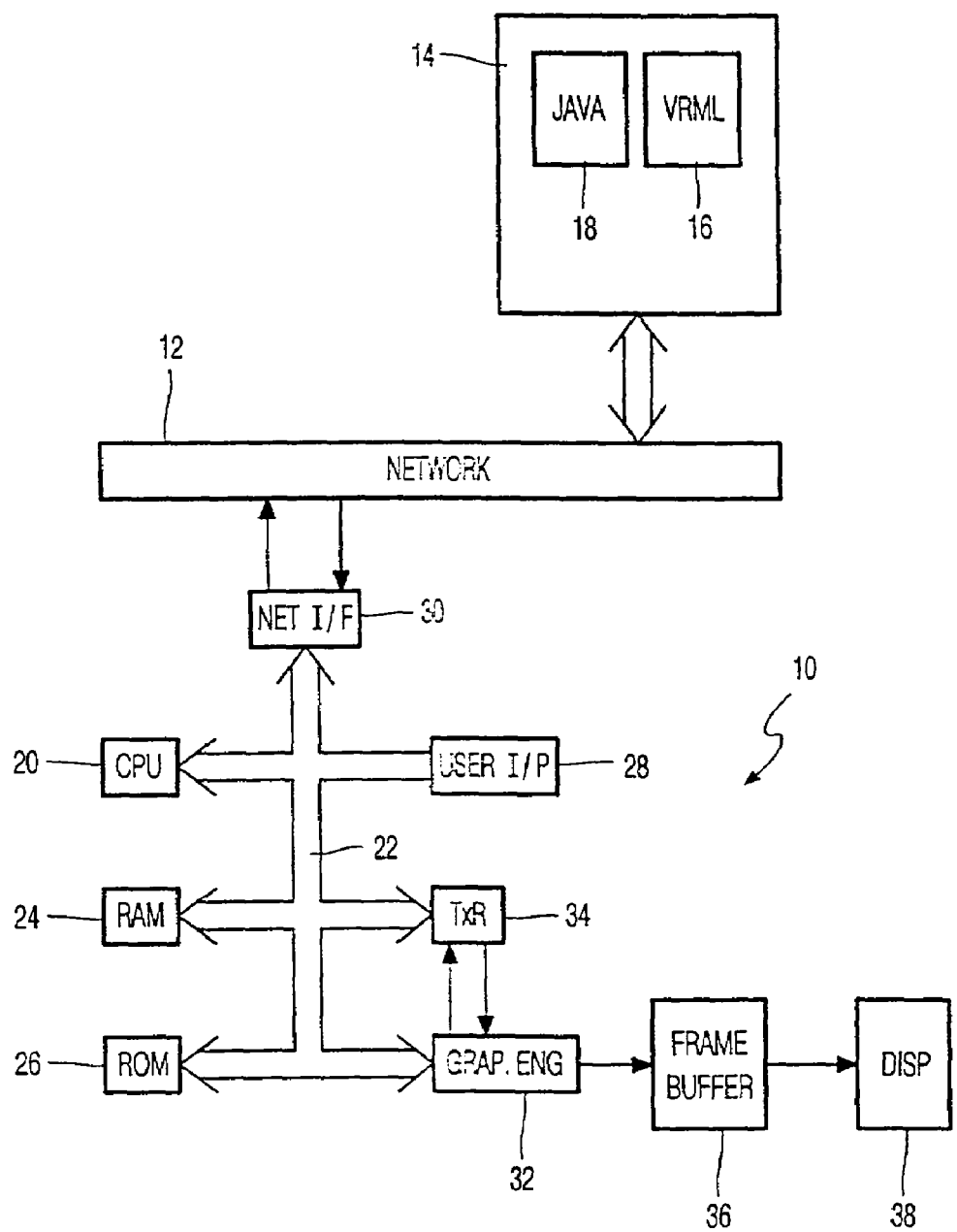
FIG. 1 is a block schematic diagram of an image processing system embodying the present invention.

FIG. 1 is a block schematic diagram of a user apparatus, such as a personal computer (PC) 10, for accessing a virtual environment via connection to a data network 12—for example the Internet/World Wide Web, with the virtual environment being provided by a remote service provider 14. The data 16 defining the appearance, structure and behaviour of the virtual environment in conformance with the VRML standard is accessed by the user sending a request message to the service provider VRML store, as identified by a unique URL (uniform resource locator). Also provided by the service provider is a source 18 of control and operational instructions for implementing operational features of the virtual environment. These instructions, preferably as segments of a virtual machine code (such as the Java® virtual machine language developed by Sun Microsystems Inc) for general system flexibility, are accessed by the users system via a further URL, as will be described below.

The users system 10 comprises a main processor 20 coupled via address and data bus 22 to a random-access memory (RAM) 24, such as a hard disk, and read-only memory (ROM) 26. Also connected via the bus 22 are one or more user input devices 28, such as a keyboard and mouse or joystick, and an interface 30 to the network 12. The users system is configured, via an operating program loaded from ROM 26, as a network browser with the network interface configured according to the type of data transfer supported by the users system: for a home user, the network link is likely to be via telephone line and accordingly the interface will incorporate a modem, controlled from the main processor 20.

Further details of the above described features of the users system will be familiar to the skilled practitioner and will not be further discussed herein, unless relevant to, or illustrative of, the operation of the present invention. It will be understood that the user apparatus need not be a PC; consumer systems specializing in network access/browsing (but otherwise of limited capability) such as the Philips Magnavox WebTV® and similar systems may embody the present invention.

The generation of images of the virtual environment from the data obtained via the network 12 is handled by a graphics processor 32 and texture management stage 34, both of which are coupled to receive input data via the address and data bus 22. The texture management stage 34, generating texels using parameterized procedural texture specifications, supplies the texture to be applied by the graphics processor 32 to the polygonal image primitives making up the image of the virtual environment. The generated images, assembled in a frame buffer 36, are finally output to a display device 38, such as a computer monitor.

The general procedure implemented by the system of FIG. 1 in obtaining data from the service provider and generating images of the virtual environment will now be described with reference to the flow chart of FIG. 2. As indicated previously, the first step 201 is for the system to contact the service provider and request downloading of the data defining the virtual environment in accordance with the VRML specification. Nested within the VRML data supplied by the service provider will be pointers to further locations (in the form of further URLs) from which the required specification of the procedural data required for rendering the VRML scene may be obtained. Consequently, the next step 202 of the procedure is to identify and extract these texture URLs from the received VRML data stream.

Having obtained the texture URL, or more preferably a sequence of URLs identifying a preferred and a number of alternative sources for the information, the user's system (at step 203) will sequentially attempt to contact the URLs listed to obtain the procedural texture data until it is successful. It should be noted that the way in which the user's system is configured as a browser differs slightly with respect to conventional web browsers in that, on contacting a site identified by URL to obtain texture data, a conventional browser would be seeking to obtain a texture map or image whereas the browser embodying the present invention will be requesting the supply of machine code segments held at these sites. These machine code segments will suitably be in a machine-independent form such as the above mentioned Java® virtual code.

Having successfully contacted a site capable of supplying the machine-independent code segments specifying the required procedural texture or textures, the user's system receives from this source a short code segment (at step 204) referred to as a code skeleton. The function of the code skeleton is to cause the user's system to request from the source the texture-specifying data in a form most suited to the texture data processing capability of the user's system. A more detailed description of the implementation of this skeleton will be given hereinafter with reference to the flow chart of FIG. 5.

Figure 2:
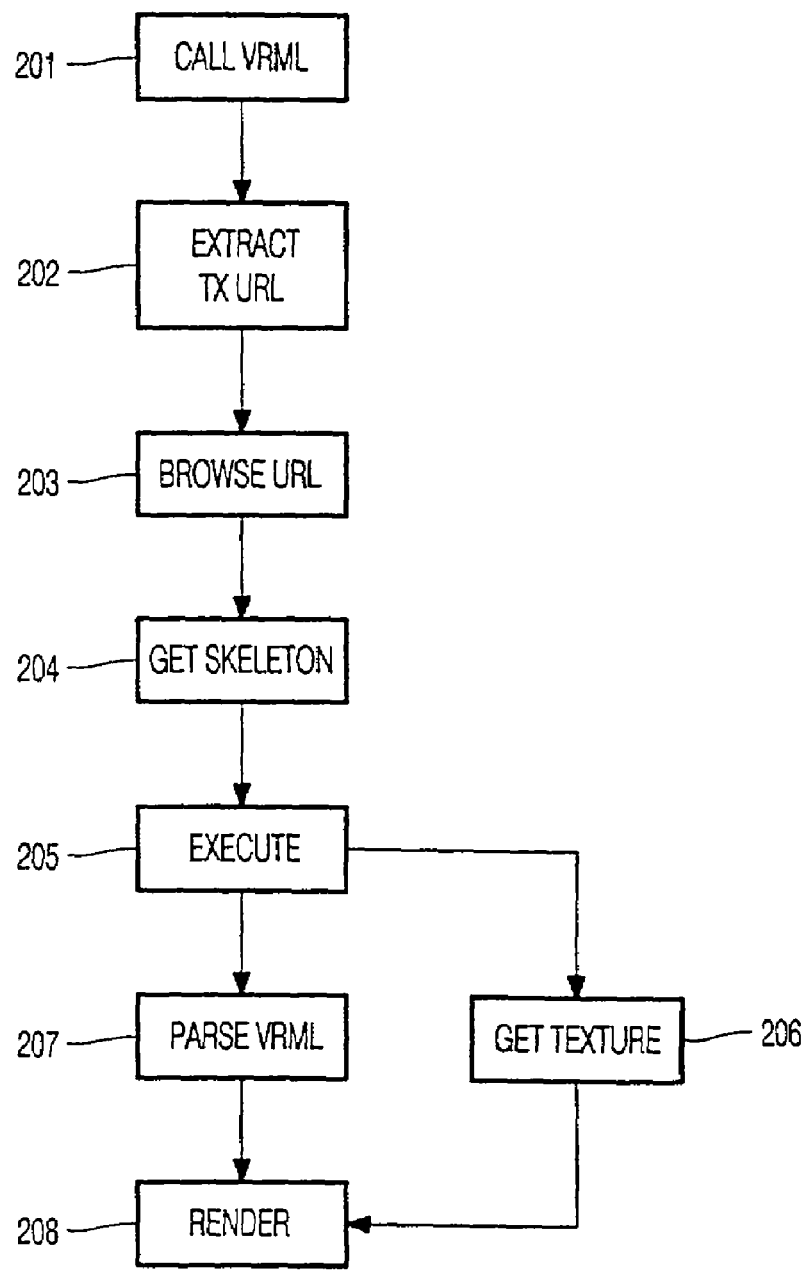
FIG. 2 is a simplified flow chart illustrating data acquisition procedure of the system of FIG. 1.

Continuing with FIG. 2, having obtained the procedural texture specifications from the remote source, and translated them as necessary from the machine-independent code form to the local machine code of the user's system, the generation of the textured image commences at step 205 with the execution of the procedural textural specifications (via texture generation stage 34; FIG. 1) such as to obtain, at step 206, the required texels for mapping at the resolution required. While this is occurring, the VRML data received is parsed and processed, at step 207 (in graphics engine 32; FIG. 1), to generate a model of the virtual environment and its behaviour, including identifying the various surfaces to be textured and their associated scale and/or depth value, such as to determine the required resolution for the texture pattern to be mapped. The final stage, at step 208, combines the generated texture and polygonal image data defining the virtual environment and rendering a two-dimensional image thereof into the frame buffer (36; FIG. 1) for subsequent display.

An example of a procedural texture that may be applied is the blending operator. The blend operation calculates output texels by means of the following formula:

$$\text{output} = \text{alpha} * t0 + (1-\text{alpha}) * t1$$

where alpha, t0 to t1 are programmable constants or are obtained from one or more textures from the standardized set of procedural textures.

As an example of the application of this blend operation, if t0 is obtained from a procedural texture for marble, if alpha is obtained from a procedural texture that defines a brick wall with value 1 for the bricks and value 0 for the mortar between bricks, and if t1 is a constant specifying the color of the mortar, then the blend operation will result in a marbled brick wall.

This operation can of course be used for calculating many components of the output texels: not only for the color components red, green and blue, but if desired also for the diffuseness and glossiness parameters (as input for illumination calculations), and for small surface displacements (as inputs for bump mapping) for example.

Figure 3:
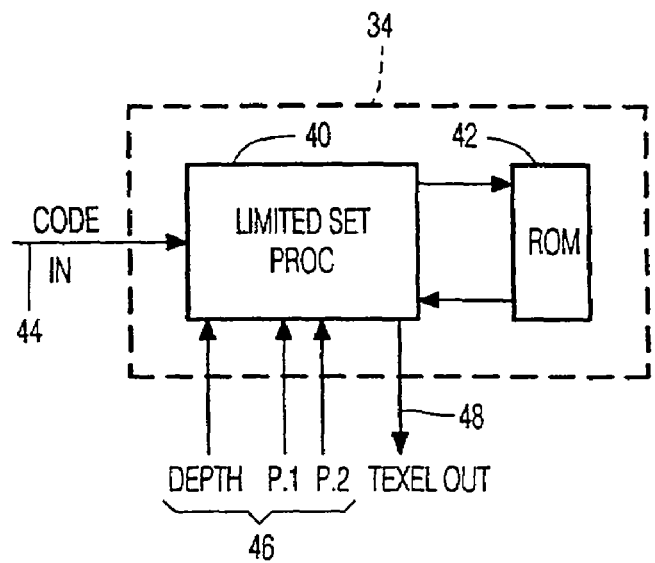
FIGS. 3 and 4 represent two different configurations of texture data processing circuit for use in the system of FIG. 1.
Figure 4:
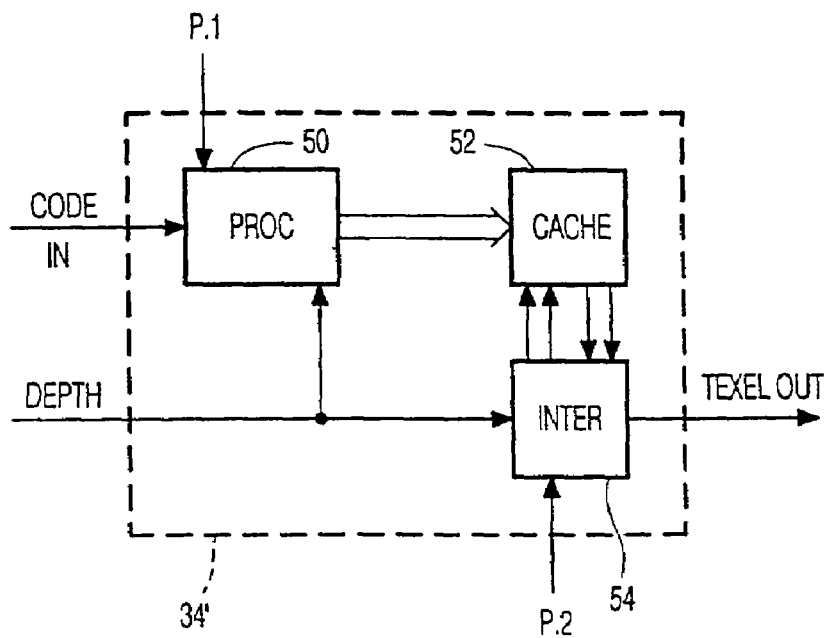

FIGS. 3 and 4 illustrate two alternative configurations for the texture generation circuit 34 of FIG. 1 each of which may suitably be implemented as a single semiconductor chip device. In the first embodiment, of FIG. 3, the bulk of device comprises a limited instruction set processor 40 having the capability to run the machine code segments that specify the various procedural textures of a predetermined standard set, but with little other capability such as to maximize the efficiency in generation of the procedural textures. In the arrangement shown, a small non-volatile memory 42 is provided to hold the limited operating system for the processor 40 for fast initialization of the texture processor 34 on boot-up or initialization of the system. In an alternative arrangement (not shown), memory 42 may be omitted, with the processor operating system being loaded up from system ROM (26; FIG. 1).

In addition to an input 44 for the machine code segments (from bus 22; FIG. 1) the texture processor of FIG. 3 has additional inputs 46 for a number of parameters including a depth value. This depth value represents the apparent depth, and suitably also orientation, of the polygonal surface onto which the texture to be generated is to be mapped. This depth value will provide an indication of the polygon "footprint" when translated to two-dimensional screen space and hence will have a direct bearing on the resolution at which the texture is to be generated, such that the output texels generated (on line 48) will not need scaling before being mapped directly onto a polygonal surface.

An alternative configuration for the texture processor 34' is shown in FIG. 4. Here it is assumed that the processor 50, while still having an operating system capability to handle all procedural textures specified in the above mentioned standardized set, is a more general device. Here, rather than generating texels to order at a given scale, the processor generates a texture map (or map segment) into an associated cache memory 52 suitably at two or more levels of resolution. From these different levels of resolution, interpolator stage 54, in response to receipt of the polygon depth signal generates texels for display at the desired resolution. While the configuration of FIG. 4 is not as efficient as that of FIG. 3, due to the lack of a specialized processor and the need to generate texture maps and then interpolate, it is a much faster option than, say, calling for texture maps to be downloaded from system storage (such as the user system hard disk) due to the proximity of processor 50 and cache 52.

Figure 5:
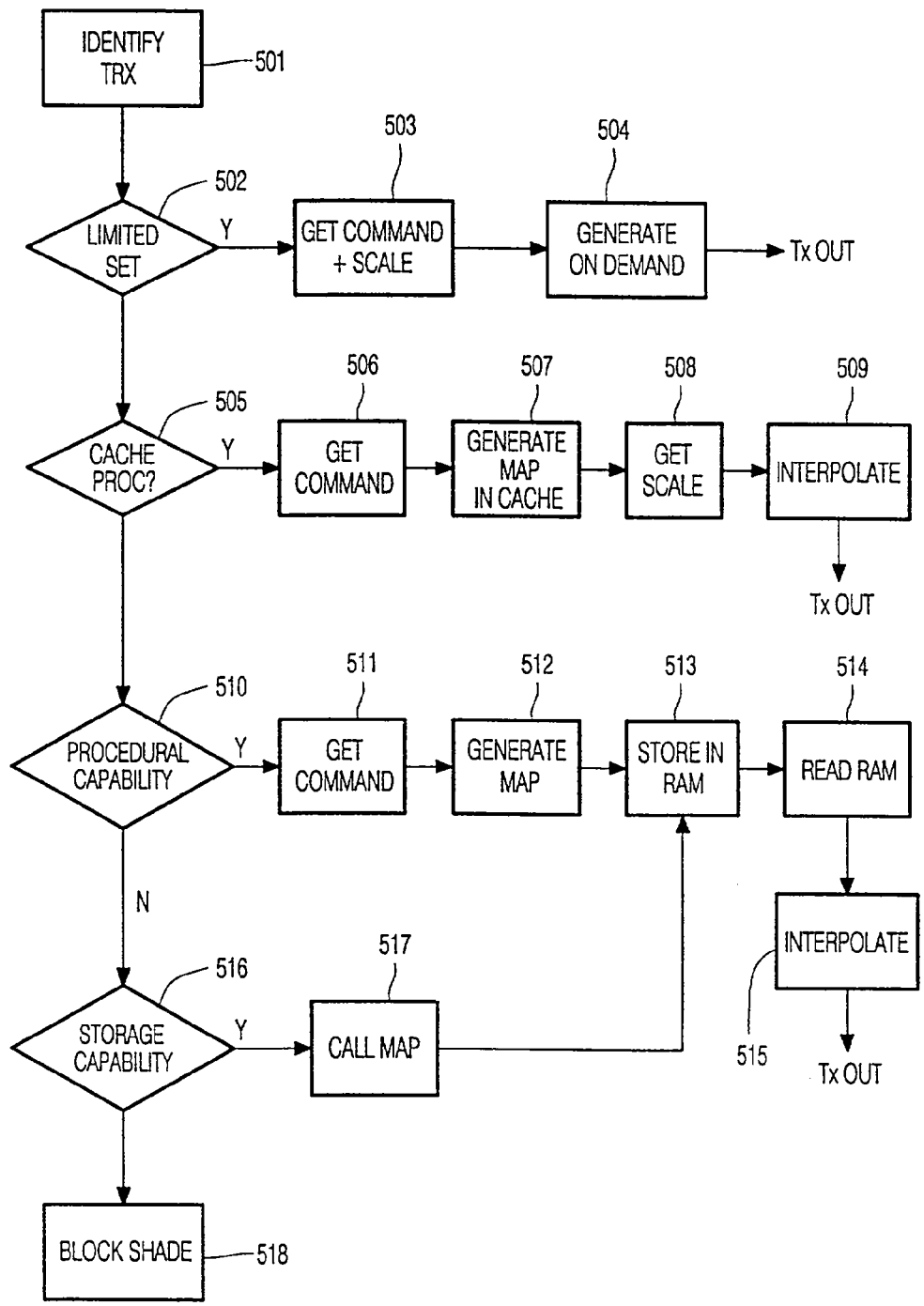
FIG. 5 is a flow chart illustrating implementation of a processing capability check applied to the system of FIG. 1.

Turning now to the flow chart of FIG. 5, this schematically represents both the operational features and results of implementation of the skeleton code sent by a source of procedural texture specification codes to identify the texture processing capability of the requesting system. The procedure begins at step 501 with a direction for the user's system to identify its texture processing capability, preferably by use of short code words indicating predetermined types. The first check, at step 502, is whether the processor is a limited instruction set processor dedicated to the standardized set of procedural textures, as with the processor of FIG. 3. If the user system does have such a texture processor, the user system can proceed to obtain the procedural texture codes and any associated scaling factors (at step 503) and subsequently (at step 504) generate on demand texels of the pattern required and to the scale desired.

If the check at step 502 is negative, that is to say the texture processor is not based on a limited instruction set processor, the next check at step 505 is to whether the texture processor has an on-board cache memory, as in the embodiment of FIG. 4. If this is the case, then, at step 506, the machine code segments specifying the procedural texture may again be obtained and implemented by the processor (50; FIG. 4) such as to generate one or more texture maps into the cache at step 507. Having determined (at step 508) the depth of the polygon surface to be textured with reference to a specified texture resolution for that polygon, the extent to which the texture for the polygon needs to be scaled up or down may be determined (at step 508). From the data in the cache an interpolator may then generate texture to the required resolution (step 509).

If the checks of both steps 502 and 505 are negative, the next step (510) is to determine whether the texture handling circuitry of the user system has any capacity for handling of procedural textures (perhaps implemented in the main system CPU rather than a dedicated texture processor). If there is a procedural capacity, the system will again proceed to obtain the code segments specifying the textures to be mapped at step 511 and to generate one or more resolutions of texture map at step 512. In this instance, without the benefit of an on-chip cache, the more lengthy process of storing the generated texture maps in RAM has to be gone through (at step 513). In order to generate texels for mapping, data from the generated and stored texture maps must be read from the RAM (step 514) and interpolated as required (step 515) in order to generate the necessary texels at the correct resolution.

The remaining stages of the procedure are in the form of a fail-safe measure if checks 502, 505 and 510 are negative (that is to say the user system has no capability for procedural texture in any form). In the absence of procedural texture capability, a check is made (step 516) to determine whether the user system has any capability for the storage of texture maps and, if so, these will be called (step 517) from their remote source and downloaded via the data network to be stored in the system RAM on receipt.

The final step, in the event that the check of step 516 proves negative, is to use a single texture value for all textured surfaces (step 518). For example, all textured surfaces may be colored purple.

From reading the present disclosure, other modifications will be apparent to persons skilled in the art. Such modifications may involve other features which are already known in the design, manufacture and use of image processing apparatus and devices and component parts thereof and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. Apparatus for texture mapping in a computer graphics system, using a predetermined set of standardized textures, the apparatus having an input to receive via a network identifying data identifying one of the set of standardized textures, and means for processing the data to generate output texels of the identified texture, wherein each texture of the standardized set is a procedural texture, the identifying data comprises one or a sequence of program commands, the execution of which will result in the generation of a respective procedural texture, with the means for processing data comprising a processor operable to implement all such input program commands or sequences of input program commands as required to generate the procedural textures of the standardized set.

2. Apparatus as claimed in claim 1, having at least one further input for one or more predetermined classes of numerical parameter, with the processor being arranged to generate procedural textures with reference to the or each numerical parameter value received.

3. Apparatus as claimed in claim 1, having at least one further input for a scale factor, with the processor being arranged to generate a procedural texture at a resolution determined by a received scale factor.

4. Apparatus as claimed in claim 1, wherein the processor is operable to implement only such input program commands or sequences of input program commands as required to generate those procedural textures of the standardized set.

5. Apparatus as claimed in claim 1, further comprising a cache memory coupled with the processor, with the processor being configured to generate said procedural textures as texture maps within said cache.

6. Apparatus as claimed in claim 5, further comprising an input to receive a scale factor, and an interpolator to generate output texels from texture map entries in the cache at a resolution determined by the received scale factor.

7. A semiconductor chip comprising a texture mapping apparatus as claimed in claim 4 on a single substrate.

8. A semiconductor chip comprising a texture mapping apparatus as claimed in claim 6, with the processor, cache and interpolator on a common substrate.

9. A computer graphics system including an apparatus as claimed in claim 1, together with a source of three-dimensional polygon data, a geometry processor coupled to receive said polygon data and arranged to generate a two-dimensional representation of said polygons, a source of program commands coupled to the input of the texture mapping apparatus and specifying textures to be applied to respective ones of said polygons, and rendering means coupled to receive the outputs of the geometry processor and texture mapping apparatus and arranged to generate an output image of said polygons with texture applied.

10. A computer graphics system as claimed in claim 9, wherein the sources of polygon data and program commands comprise an interface to a data network to which are coupled remote sources of such polygon data and program commands, the interface being coupled with a memory holding a store of network addresses for such remote sources and being operable to format and transmit messages to such addresses calling for the polygon data and program commands.

11. A computer graphics system as claimed in claim 10, wherein said program commands are transmitted over the network in virtual machine code and the system further comprises means for conversion of the program commands to a local machine code supported by the processor.

* * * * *